United States Patent
Hase

(10) Patent No.: US 8,537,049 B2
(45) Date of Patent: Sep. 17, 2013

(54) MULTI-FUNCTION RADAR DEVICE

(75) Inventor: Eiichi Hase, Iruma (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 222 days.

(21) Appl. No.: 13/254,065

(22) PCT Filed: Jan. 25, 2010

(86) PCT No.: PCT/JP2010/050888
§ 371 (c)(1),
(2), (4) Date: Aug. 31, 2011

(87) PCT Pub. No.: WO2010/100976
PCT Pub. Date: Sep. 10, 2010

(65) Prior Publication Data
US 2012/0026030 A1 Feb. 2, 2012

(30) Foreign Application Priority Data
Mar. 5, 2009 (JP) .................................. 2009-051838

(51) Int. Cl.
*G01S 13/34* (2006.01)

(52) U.S. Cl.
USPC .................. 342/128; 342/84; 342/85; 342/91

(58) Field of Classification Search
USPC .............................. 342/128, 82–88, 89, 91–92
See application file for complete search history.

(56) References Cited

U.S. PATENT DOCUMENTS

| | | | | | |
|---|---|---|---|---|---|
| 5,677,695 | A | * | 10/1997 | Suzuki et al. | 342/109 |
| 6,094,158 | A | * | 7/2000 | Williams | 342/70 |
| 6,664,919 | B2 | * | 12/2003 | Isaji | 342/109 |
| 6,859,168 | B2 | * | 2/2005 | Isaji | 342/128 |

(Continued)

FOREIGN PATENT DOCUMENTS

| | | |
|---|---|---|
| CN | 1396464 | 2/2003 |
| JP | 61-54479 | 3/1986 |

(Continued)

OTHER PUBLICATIONS

International Search Report for PCT International Application No. PCT/2010/050888 mailed on Mar. 2, 2010.

*Primary Examiner* — John B Sotomayor
(74) *Attorney, Agent, or Firm* — Brundidge & Stanger, P.C.

(57) ABSTRACT

Provided is a multi-function radar apparatus capable of measuring both a distance to a target object and a temperature of the target object with high accuracy. A transmission signal produced from a high-frequency signal generating unit (9) is amplified by a transmission signal amplifying unit (12) while intermittently stopped by a transmission intermittent stop switch (11), and is emitted to a target object (13) via a circulator unit (2). A reflected wave from the target object (13) is input as a reception signal to a transmitting and receiving antenna (1) while the transmission signal is emitted, and a radiated wave from the target object (13) is input as the reception signal thereto while the transmission signal is not emitted. The reception signal is amplified by a reception signal amplifying unit (3) via the circulator unit (2), and is mixed by a frequency converting unit (4) with the transmission signal branched by a high-frequency signal branching unit (10) to thereby generate a beat signal. A signal processing unit (6) calculates the distance to the target object (13) and the temperature of the target object (13) based on the beat signal amplified by a beat signal amplifying unit (5).

7 Claims, 8 Drawing Sheets

(56) References Cited

U.S. PATENT DOCUMENTS

| | | | |
|---|---|---|---|
| 7,525,479 B2 * | 4/2009 | Nagai | 342/158 |
| 2003/0016163 A1 | 1/2003 | Isaji | |
| 2003/0117313 A1 * | 6/2003 | Isaji | 342/70 |
| 2008/0122680 A1 * | 5/2008 | Morinaga et al. | 342/109 |
| 2009/0224845 A1 * | 9/2009 | Suzuki | 332/118 |
| 2012/0026030 A1 * | 2/2012 | Hase | 342/128 |
| 2012/0092209 A1 * | 4/2012 | Nakagawa | 342/109 |

FOREIGN PATENT DOCUMENTS

| | | |
|---|---|---|
| JP | 62-19780 | 1/1987 |
| JP | 63-122979 | 5/1988 |
| JP | 5-240947 | 9/1993 |
| JP | 7-209413 | 8/1995 |
| JP | 2006-38798 | 2/2006 |

\* cited by examiner

MULTI-FUNCTION RADAR DEVICE

INCORPORATION BY REFERENCE

The present application claims priority from the prior Japanese Patent Application No. 2009-051838 filed on Mar. 5, 2009, the content of which is hereby incorporated by reference into this application.

TECHNICAL FIELD

The present invention relates to a radar apparatus and, more particularly, to a multi-function radar apparatus having two or more functions.

BACKGROUND ART

Conventionally, disclosed is a radar device that emits a frequency-modulated transmission signal to a target object, and measures a distance to the target object based on a beat signal generated by mixing its reflected wave and the transmission signal (see Patent Literature 1).

Further, all objects with a temperature naturally emits infrared, and an object emits, as having a higher temperature, infrared stronger. As a result, known is an infrared thermometer in which when infrared emitted from a target object is received and intensity of the received infrared is analyzed, a temperature of the target object is measured.

FIG. 9 illustrates a conventional measuring device that collectively has functions for measuring a distance to a target object and a temperature of the target object.

The conventional measuring device includes a transmitting and receiving antenna 901, a circulator unit 902, a reception signal amplifying unit 903, a frequency converting unit 904, a beat signal amplifying unit 905, a signal processing unit 906, a frequency modulation signal generating unit 908, a high-frequency signal generating unit 909, a high-frequency signal branching unit 910, a transmission signal amplifying unit 912, an infrared light receiving lens 914, and an infrared thermometer 915.

In the conventional measuring device, a high-frequency signal generated from the high-frequency signal generating unit 909 is frequency-modulated by a control voltage produced from the frequency modulation signal generating unit 908 under the control of the signal processing unit 906, and is output as a transmission signal.

FIG. 10 is schematic diagrams of control using a control voltage of the conventional measuring device. FIG. 10(a) illustrates an outline of the control voltage in the frequency modulation signal generating unit 908, and FIG. 10(b) illustrates an outline of frequency in the high-frequency signal generating unit 909. As illustrated in FIG. 10(a), the control voltage produced from the frequency modulation signal generating unit 908 under the control of the signal processing unit 906 changes from a voltage V1 to V2 during the time T1 to repeat this change in each time T1. Then, as illustrated in FIG. 10(b), according to a change in the control voltage of the frequency modulation signal generating unit 908, a high-frequency signal generated in the high-frequency signal generating unit 909 changes from a frequency F1 to F2 during the time T1 to repeat this change in each time T1. As described above, from the high-frequency signal generating unit 909, the transmission signal frequency-modulated by the control voltage from the frequency modulation signal generating unit 908 is continuously supplied to the high-frequency signal branching unit 910.

Returning to FIG. 9, the transmission signal produced from the high-frequency signal generating unit 909 is branched by the high-frequency signal branching unit 910, power-amplified by the transmission signal amplifying unit 912, and emitted toward the target object 913 from the transmitting and receiving antenna 901 via the circulator unit 902.

Due to the emission of the transmission signal, reflected waves from the target object 913 is input to the transmitting and receiving antenna 901. The reflected waves from the target object 913 is produced from the transmitting and receiving antenna 901 as the reception signal. The reception signal is amplified by the reception signal amplifying unit 903 via the circulator unit 902 and is supplied to the frequency converting unit 904. In the frequency converting unit 904, the transmission signal branched by the high-frequency signal branching unit 910 and the reception signal are mixed, and a beat signal is supplied to the beat signal amplifying unit 905. The supplied beat signal is amplified by the beat signal amplifying unit 905, and is supplied to the signal processing unit 906. The signal processing unit 906 calculates a distance to the target object based on the beat signal.

On the other hand, infrared emitted from the target object 913 is received by the infrared light receiving lens 914 and is supplied to the infrared thermometer 915. The infrared thermometer 915 analyzes intensity of the infrared and supplies the analyzed signal to the signal processing unit 906. The signal processing unit 906 finds a temperature distribution of the target object 913 based on the analyzed signal, and calculates the temperature of the target object 913 from its average.

CITATION LIST

Patent Literature

Patent Literature 1: JP-A-07-209413

SUMMARY OF INVENTION

Technical Problem

In a measuring device illustrated in FIG. 9, when a distance to a target object and a temperature of the target object are measured at the same time, both of a direction and focus of the transmitting and receiving antenna 901 and the infrared light receiving lens 914 need to be focused on the target object 913. At this time, required is a structure for adjusting angles of the transmitting and receiving antenna 901 and the infrared light receiving lens 914 in up-down and right-left directions. However, depending on a measuring place and a structure of the measuring device, angles of the transmitting and receiving antenna 901 and the infrared light receiving lens 914 cannot be sufficiently adjusted in some cases. When the angles of the transmitting and receiving antenna 901 and the infrared light receiving lens 914 are adjusted, the transmission signal emitted from the transmitting and receiving antenna 901 may be unnecessarily reflected by the infrared light receiving lens 914. Further, the infrared from the target object 913 may be shielded by the transmitting and receiving antenna 901 and may not be sufficiently supplied to the infrared light receiving lens 914.

In view of the foregoing, it is an object of the present invention to provide a multi-function radar apparatus capable of measuring both of a distance to a target object and a temperature of the target object with high accuracy.

Solution to Problem

To accomplish the above objects, according to one aspect of the present invention, there is provided a multi-function radar apparatus. This multi-function radar apparatus having a high-frequency signal generating unit that supplies a frequency-modulated transmission signal, an antenna that emits the transmission signal to a target object and receives measurement information on the target object as a reception signal, a frequency converting unit that mixes the transmission signal and the reception signal to generate a beat signal, and a signal processing unit that performs measurement on the target object based on the beat signal, includes a transmission signal intermittent stop unit that intermittently stops emission of the transmission signal, wherein the antenna receives a reflected wave from the target object as the measurement information while the transmission signal is emitted, and receives a radiated wave from the target object as the measurement information while the transmission signal is not emitted, and the signal processing unit measures a distance to the target object based on the beat signal while the transmission signal is emitted, and measures a temperature of the target object based on the beat signal while the transmission signal is not emitted.

Advantageous Effects of Invention

According to the present invention, the multi-function radar apparatus can measure both of a distance to a target object and a temperature of the target object with high accuracy.

Other objects, features and advantages of the invention will become apparent from the following description of the embodiments of the invention taken in conjunction with the accompanying drawings.

DESCRIPTION OF EMBODIMENTS

Preferred embodiments of the present invention will be described in detail below with reference to the accompanying drawings.

<First Embodiment>

Figure 1:
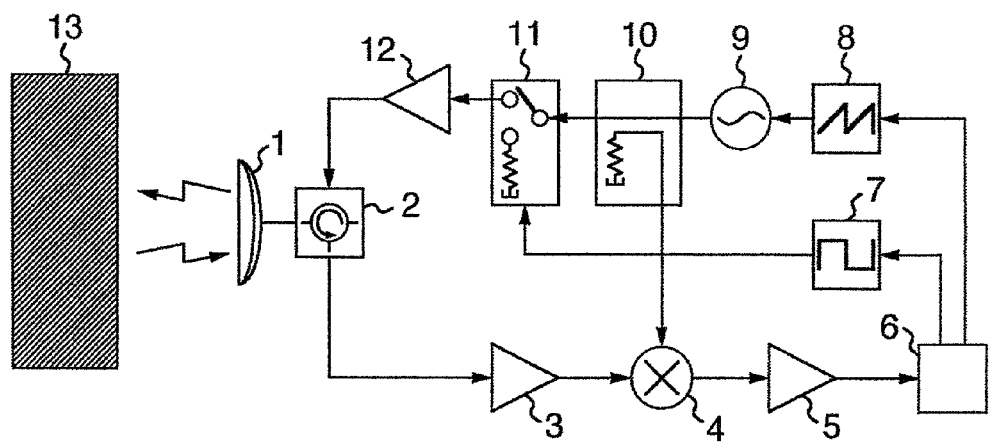
FIG. 1 is a configuration diagram illustrating a function of a multi-function radar apparatus according to a first embodiment of the invention.

A multi-function radar apparatus illustrated in FIG. 1 includes a signal processing unit 6, a frequency modulation signal generating unit 8, a high-frequency signal generating unit 9, a high-frequency signal branching unit 10, an intermittent stop signal generating unit 7, a transmission intermittent stop switch 11, a transmission signal amplifying unit 12, a circulator unit 2, a transmitting and receiving antenna 1, a reception signal amplifying unit 3, a frequency converting unit 4, and a beat signal amplifying unit 5.

The frequency modulation signal generating unit 8 supplies a control voltage for performing frequency modulation to a high-frequency signal generating unit 9 under the control of the signal processing unit 6. The high-frequency signal generating unit 9 generates a high-frequency signal, and supplies to the high-frequency signal branching unit 10 as a transmission signal a high-frequency signal frequency-modulated by the control voltage produced from the frequency modulation signal generating unit 8.

The transmission signal produced from the high-frequency signal generating unit 9 is branched by the high-frequency signal branching unit 10, and is supplied to the transmission intermittent stop switch 11 and the frequency converting unit 4.

To the transmission intermittent stop switch 11, a control voltage produced from the intermittent stop signal generating unit 7 is supplied under the control of the signal processing unit 6. According to the control voltage produced from the intermittent stop signal generating unit 7, the transmission intermittent stop switch 11 switches a signal path so as to or not to supply the transmission signal produced from the high-frequency signal branching unit 10 to the transmission signal amplifying unit 12.

As a result, the transmission signal supplied to the transmission intermittent stop switch 11 is intermittently supplied to the transmission signal amplifying unit 12 according to a connection state of the transmission intermittent stop switch 11.

The transmission signal supplied to the transmission signal amplifying unit 12 is power-amplified and emitted via the circulator unit 2 from the transmitting and receiving antenna 1 to a target object 13.

The emitted transmission signal is reflected by the target object 13, and a reflected wave is input to the transmitting and receiving antenna 1.

The reflected wave input to the transmitting and receiving antenna 1 is supplied to the circulator unit 2 as a reception signal. Then, the reception signal is supplied to the reception signal amplifying unit 3 by the circulator unit 2, is amplified by the reception signal amplifying unit 3, and is supplied to the frequency converting unit 4.

The frequency converting unit 4 mixes the transmission signal produced from the high-frequency signal branching unit 10 and the reception signal produced from the reception signal amplifying unit 3, and generates a beat signal being a difference signal between the transmission signal and the reception signal.

The generated beat signal is amplified by the beat signal amplifying unit 5, and is supplied to the signal processing unit 6.

The signal processing unit 6 calculates a distance to the target object 13 based on the beat signal produced from the beat signal amplifying unit 5.

Incidentally, all substances with heat emit thermal noise according to its temperature. To cope with the above-described problem, while the transmission signal is not emitted from the transmitting and receiving antenna 1, a radiated wave is received as thermal noise from the target object 13 to thereby measure a temperature of the target object 13.

While the transmission signal is not emitted, when receiving radiated waves from the target object 13, the transmitting and receiving antenna 1 supplies it to the circulator unit 2 as the reception signal. The reception signal supplied to the circulator unit 2 is amplified by the reception signal amplifying unit 3, and then is mixed by the frequency converting unit 4 with the transmission signal branched by the high-frequency signal branching unit 10.

The beat signal resulting from mixing the transmission signal and the reception signal by the frequency converting unit 4 is amplified by the beat signal amplifying unit 5 and is supplied to the signal processing unit 6.

The signal processing unit 6 calculates a temperature of the target object 13 based on the beat signal produced from the beat signal amplifying unit 5.

Figure 2:
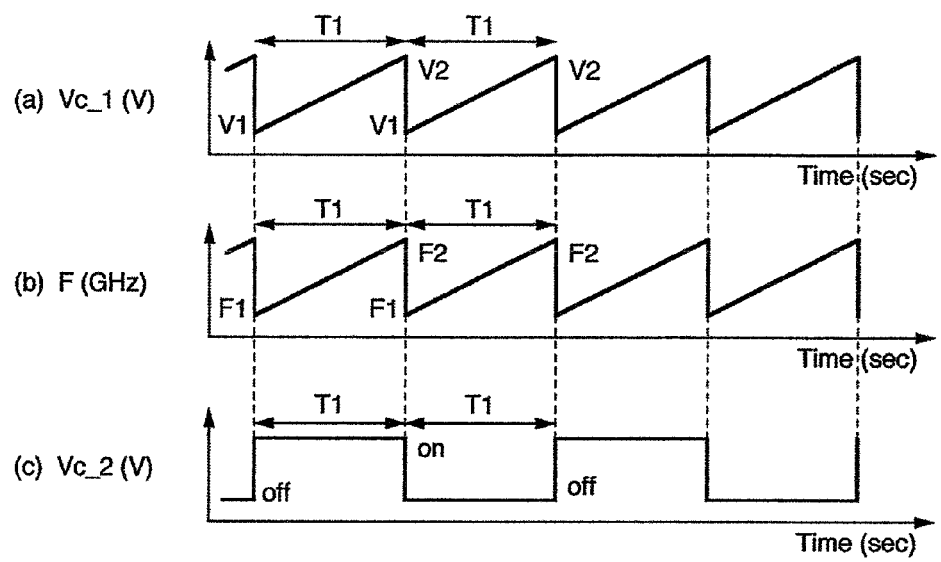
FIG. 2 is schematic diagrams of control using a control voltage of the multi-function radar apparatus according to the first embodiment of the invention, FIG. 2($a$) illustrates an outline of the control voltage of a frequency modulation signal generating unit, FIG. 2($b$) illustrates an outline of frequency of a high-frequency signal generating unit, and FIG. 2($d$) illustrates an outline of the control voltage of an intermittent stop signal generating unit.

As can be seen from the above discussion, according to the present embodiment, when transmission of high-frequency signals is intermittently stopped, both of the distance to the target object 13 and the temperature of the target object 13 can be measured. A relationship among the control voltage of the frequency modulation signal generating unit 8, the frequency modulation of the high-frequency signal generating unit 9, and the control voltage of the intermittent stop signal generating unit 7 in the present embodiment will be described with reference to FIG. 2.

FIG. 2(a) illustrates the control voltage of the frequency modulation signal generating unit 8. The control voltage of the frequency modulation signal generating unit 8 changes from a voltage V1 to V2 during the time T1, and when changing up to the voltage V2, it returns to the voltage V1. The control voltage repeatedly changes from the voltage V1 to V2 during the next time T1 again.

FIG. 2(b) illustrates frequency modulation of the high-frequency signal generating unit 9. The frequency of the high-frequency signal generating unit 9 is frequency-modulated by the control voltage of the frequency modulation signal generating unit 8. Therefore, while the control voltage of the frequency modulation signal generating unit 8 changes from the voltage V1 to V2, the frequency changes from a frequency F1 to F2 during the time T1.

FIG. 2(c) illustrates the control voltage of the intermittent stop signal generating unit 7. The control voltage of the intermittent stop signal generating unit 7 turns "ON" or "OFF" for each time T1, and keeps a state of "ON" or "OFF" during each time T1. When the control voltage of the intermittent stop signal generating unit 7 turns "ON", a connection state of the transmission intermittent stop switch 11 is controlled so as to supply to the transmission signal amplifying unit 12 the transmission signal produced from the high-frequency signal generating unit 10. On the other hand, when the control voltage of the intermittent stop signal generating unit 7 turns "OFF", a connection state of the transmission intermittent stop switch 11 is controlled so as not to supply to the transmission signal amplifying unit 12 the transmission signal produced from the high-frequency signal generating unit 10.

As described above, according to the present embodiment, when including a unit that intermittently stops transmission of high-frequency signals, the multi-function radar apparatus can receive high-frequency signals reflected by the target object 13 and measure a distance to the target object 13 while high-frequency signals are emitted. Further, while high-frequency signals are not emitted, the multi-function radar apparatus 353 can receive radiated waves emitted by the target object 13 and measure the temperature of the target object 13. Therefore, since one transmitting and receiving antenna 1 can measure both of the distance to the target object 13 and the temperature of the target object 13, radio wave interference is less during the measurement of the target object 13. As a result, the multi-function radar apparatus 353 can measure both of the distance to the target object 13 and the temperature of the target object 13 with high accuracy.

<Second Embodiment>

In the present embodiment, a gain adjustment unit 300 is provided in place of the reception signal amplifying unit 3 according to the first embodiment. The same reference numerals as those of the first embodiment are given to the same components as in the first embodiment, and the description will be omitted.

Figure 3:
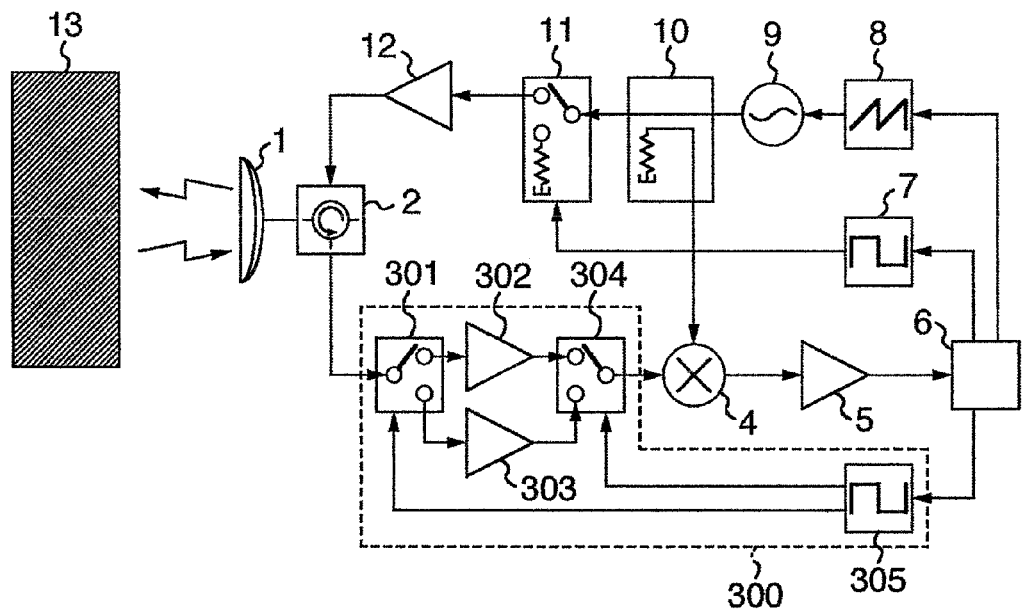
FIG. 3 is a configuration diagram illustrating a function of the multi-function radar apparatus according to a second embodiment of the invention.

When receiving reflected waves from the target object 13 or radiated waves from the target object 13, the gain adjustment unit 300 illustrated in FIG. 3 changes a gain for amplifying the reception signal and supplies the reception signal to the frequency converting unit 4.

The gain adjustment unit 300 has a first reception signal changeover switch 301, a first reception signal amplifying unit 302, a second reception signal amplifying unit 303, a second reception signal changeover switch 304, and a gain-switching signal generating unit 305. The first reception signal amplifying unit 302 and the second reception signal amplifying unit 303 are previously set so that gains are different from each other. In the present embodiment, a gain of the second reception signal amplifying unit 303 is set to be larger than that of the first reception signal amplifying unit 302.

To the first reception signal changeover switch 301 and the second reception signal changeover switch 304, the control voltage from the gain-switching signal generating unit 305 under the control of the signal processing unit 6 is supplied. While the transmission signal is emitted, the gain-switching signal generating unit 305 supplies the control voltage turned "ON" to the first reception signal changeover switch 301 and the second reception signal changeover switch 304. On the other hand, while the transmission signal is not emitted, the gain-switching signal generating unit 305 supplies the control voltage turned "OFF" thereto.

When the control voltage turned "ON" is supplied, the first reception signal changeover switch 301 is connected to the first reception signal amplifying unit 302, and supplies the reception signal from the circulator unit 2 thereto. Further, when the control voltage turned "ON" is supplied, the second reception signal changeover switch 304 is connected to the first reception signal amplifying unit 302, and supplies the reception signal therefrom to the frequency converting unit 4.

On the other hand, when the control voltage turned "OFF" is supplied, the first reception signal changeover switch 301 is connected to the second reception signal amplifying unit 303, and supplies the reception signal from the circulator unit 2 thereto. Further, when the control voltage turned "OFF" is supplied, the second reception signal changeover switch 304 is connected to the second reception signal amplifying unit 303, and supplies the reception signal therefrom to the frequency converting unit 4.

As a result, while the transmission signal is emitted, the reception signal that is received by the transmitting and receiving antenna 1 and is produced from the circulator unit 2 is supplied to the first reception signal amplifying unit 302 from the first reception signal changeover switch 301, is amplified thereby, and supplied to the frequency converting unit 4 via the second reception signal changeover switch 304 according to the control voltage from the gain-switching signal generating unit 305. On the other hand, while the transmission signal is not emitted, the reception signal that is received by the transmitting and receiving antenna 1 and is produced from the circulator unit 2 is supplied to the second reception signal amplifying unit 303 from the first reception signal changeover switch 301, is amplified thereby, and supplied to the frequency converting unit 4 via the second reception signal changeover switch 304 according to the control voltage from the gain-switching signal generating unit 305.

In general, the reception signal including radiated waves from the target object 13 is weaker than that including reflected waves from the target object 13. However, by using the gain adjustment unit 300, the reception signal including the radiated waves from the target object 13 is amplified larger than that including the reflected waves from the target object 13. Therefore, sensitivity for measuring the temperature is improved.

Figure 4:
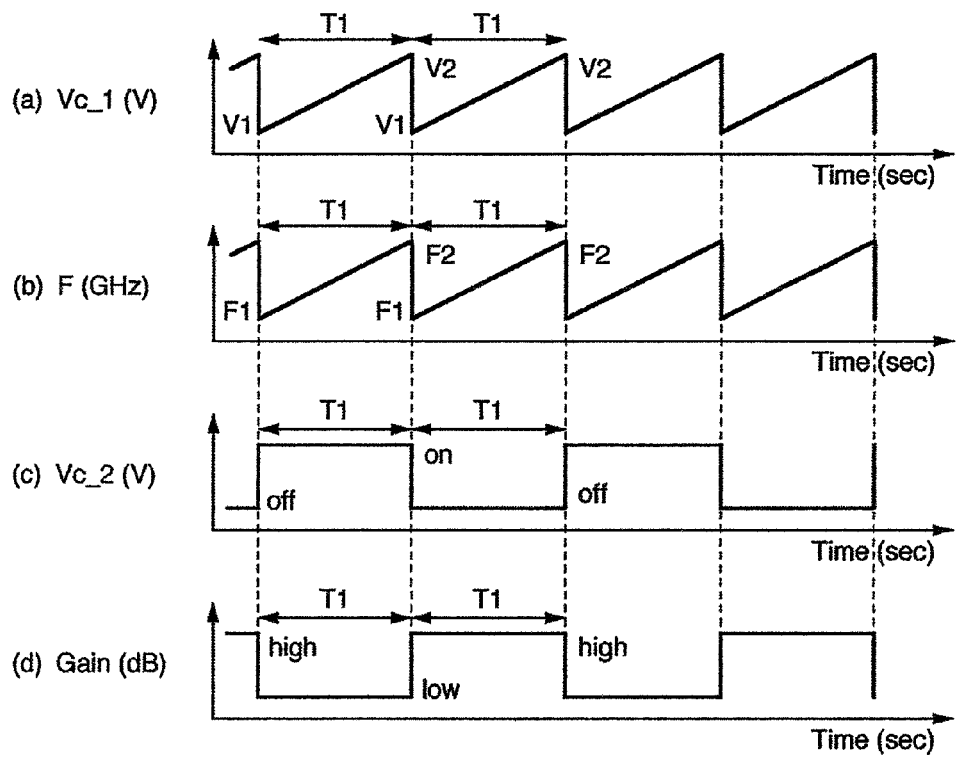
FIG. 4 is schematic diagrams of control using the control voltage of the multi-function radar apparatus according to the second embodiment of the invention, FIG. 4($a$) illustrates an outline of the control voltage of the frequency modulation signal generating unit, FIG. 4($b$) illustrates an outline of a frequency of the high-frequency signal generating unit, FIG. 4($c$) illustrates an outline of the control voltage of the intermittent stop signal generating unit, and FIG. 4($d$) illustrates an outline of a gain of a gain adjustment unit.

A relationship among the control voltage of the frequency modulation signal generating unit 8, the frequency modulation of the high-frequency signal generating unit 9, the control voltage of the intermittent stop signal generating unit 7, and the gain of the gain adjustment unit 300 in the present embodiment is illustrated in FIG. 4.

FIG. 4(a) illustrates the control voltage of the frequency modulation signal generating unit 8, FIG. 4(b) illustrates the frequency modulation of the high-frequency signal generating unit 9, and FIG. 4(c) illustrates the control voltage of the intermittent stop signal generating unit 7. The relationship between the above items is the same as that of FIG. 2 described in the first embodiment, and therefore the description will be omitted.

FIG. 4(d) illustrates a change in the gain of the gain adjustment unit 300. While the control voltage of the intermittent stop signal generating unit 7 illustrated in FIG. 4C is turned "ON", namely while the transmission signal is emitted, since the reception signal is amplified by the first reception signal amplifying unit 302, the gain of the gain adjustment unit 300 is reduced. On the other hand, while the control voltage of the intermittent stop signal generating unit 7 illustrated in FIG. 4C is turned "OFF", namely while the transmission signal is not emitted, since the reception signal is amplified by the second reception signal amplifying unit 303, the gain of the gain adjustment unit 300 is elevated.

As described above, when the gain adjustment unit 300 is provided, the multi-function radar apparatus 353 according to the present embodiment can amplify the reception signal by a gain appropriate to each level of the reception signals even if there is a difference between levels of the reception signals. Therefore, the multi-function radar apparatus 353 can improve the measurement sensitivity.

<Third Embodiment>

In the present embodiment, a measurement noise switching unit 200 is provided between the circulator unit 2 and the reception signal amplifying unit 3 according to the first embodiment. The same reference numerals as those of the first embodiment are given to the same components as in the first embodiment, and the description will be omitted.

Figure 5:
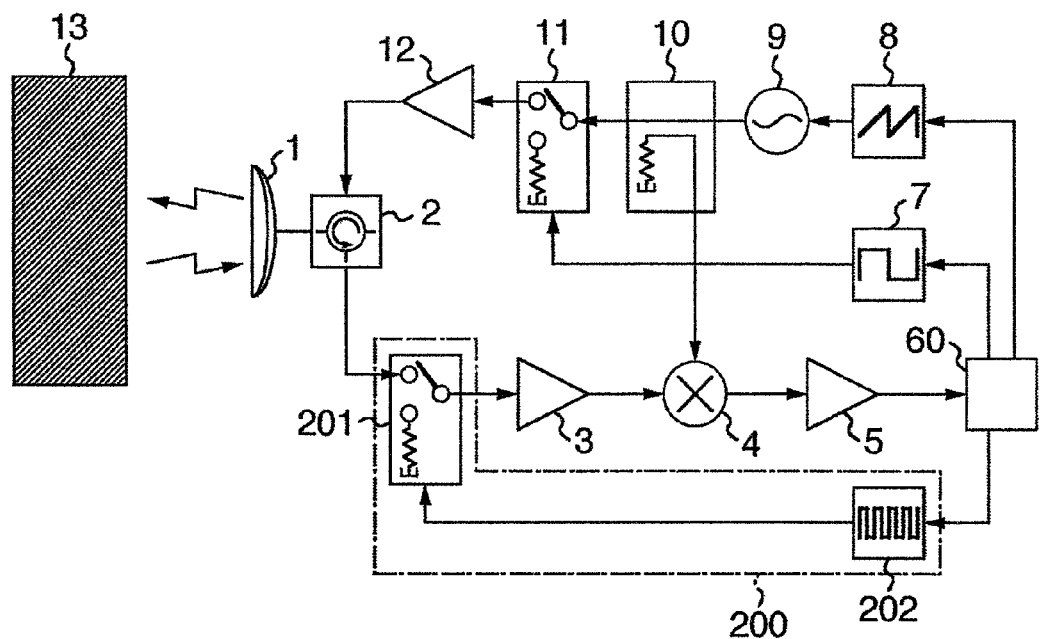
FIG. 5 is a configuration diagram illustrating a function of the multi-function radar apparatus according to a third embodiment of the invention.

While the transmission signal is not emitted, the measurement noise switching unit 200 illustrated in FIG. 5 switches over radiated waves from the target object 13 and thermal noise within the multi-function radar apparatus 353 and supplies it to the reception signal amplifying unit 3.

The measurement noise switching unit 200 has a reception signal changeover switch 201 and a measurement noise switching signal generating unit 202. To the reception signal changeover switch 201, the control voltage from the measurement noise switching signal generating unit 202 is supplied under the control of the signal processing unit 60. According to the control voltage from the measurement noise switching signal generating unit 202, while the transmission signal is not emitted, the reception signal changeover switch 201 switches over a signal path so as to or not to supply the reception signal produced from the circulator unit 2 to the reception signal amplifying unit 3. When failing to supplying the reception signal produced from the circulator unit 2 to the reception signal amplifying unit 3, the reception signal changeover switch 201 supplies thermal noise within the multi-function radar apparatus 353 as the reception signal to the reception signal amplifying unit 3.

The reception signal produced from the measurement noise switching unit 200 is amplified by the reception signal amplifying unit 3, and is mixed by the frequency converting unit 4 with the transmission signal branched by the high-frequency signal branching unit 10. A beat signal generated based on the reception signal produced from the measurement noise switching unit 200 and the transmission signal branched by the high-frequency signal branching unit 10 is amplified by the beat signal amplifying unit 5, and is supplied to the signal processing unit 60.

The signal processing unit compares one beat signal based on the thermal noise within the multi-function radar apparatus 353 and another beat signal based on the radiated waves from the target object 13, and calculates the temperature of the target object 13.

The thermal noise within the multi-function radar apparatus 353 is calculated from thermal noise power (W)=KTB (K: absolute temperature, T: bandwidth, B: Boltzmann constant).

For example, when a reception bandwidth of high-frequency signals is set to 1 GHz, and a temperature of the multi-function radar apparatus 353 is set to +23° C., thermal noise generated within the multi-function radar apparatus 353 is equal to approximately −84 dBm. On the other hand, when the temperature of the target object 13 is set to −100 to +800° C., thermal noise power is equal to approximately −86 to −78 dBm.

That is, based on the thermal noise generated within the multi-function radar apparatus 353 at the time of terminating an input to the reception signal amplifying unit 3 by a resistance of the reception signal changeover switch 201, when comparing the radiated wave from the target object 13 and the thermal noise within the multi-function radar apparatus 353, accuracy of the temperature measurement can be improved based on the radiated wave from the target object 13.

Figure 6:
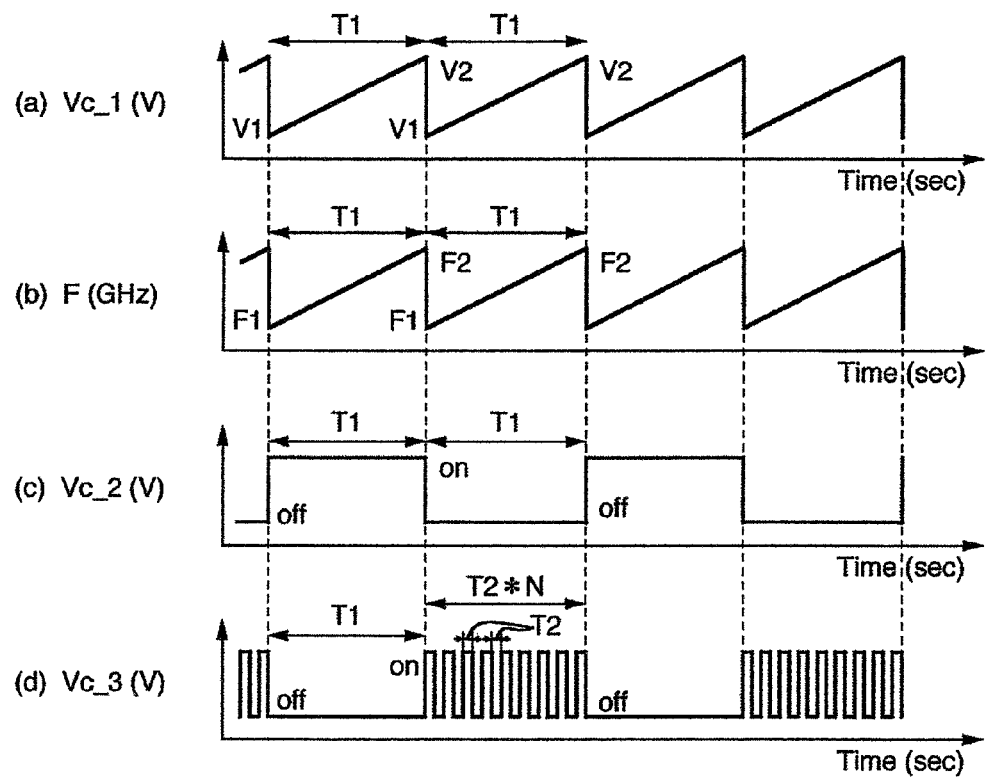
FIG. 6 is schematic diagrams of control using the control voltage of the multi-function radar apparatus according to the third embodiment of the invention, FIG. 6($a$) illustrates an outline of the control voltage of the frequency modulation signal generating unit, FIG. 6($b$) illustrates an outline of a frequency of the high-frequency signal generating unit, FIG. 6($c$) illustrates an outline of the control voltage of the intermittent stop signal generating unit, and FIG. 6($d$) illustrates an outline of the control voltage of a measurement noise switching signal generating unit.
Figure 7:
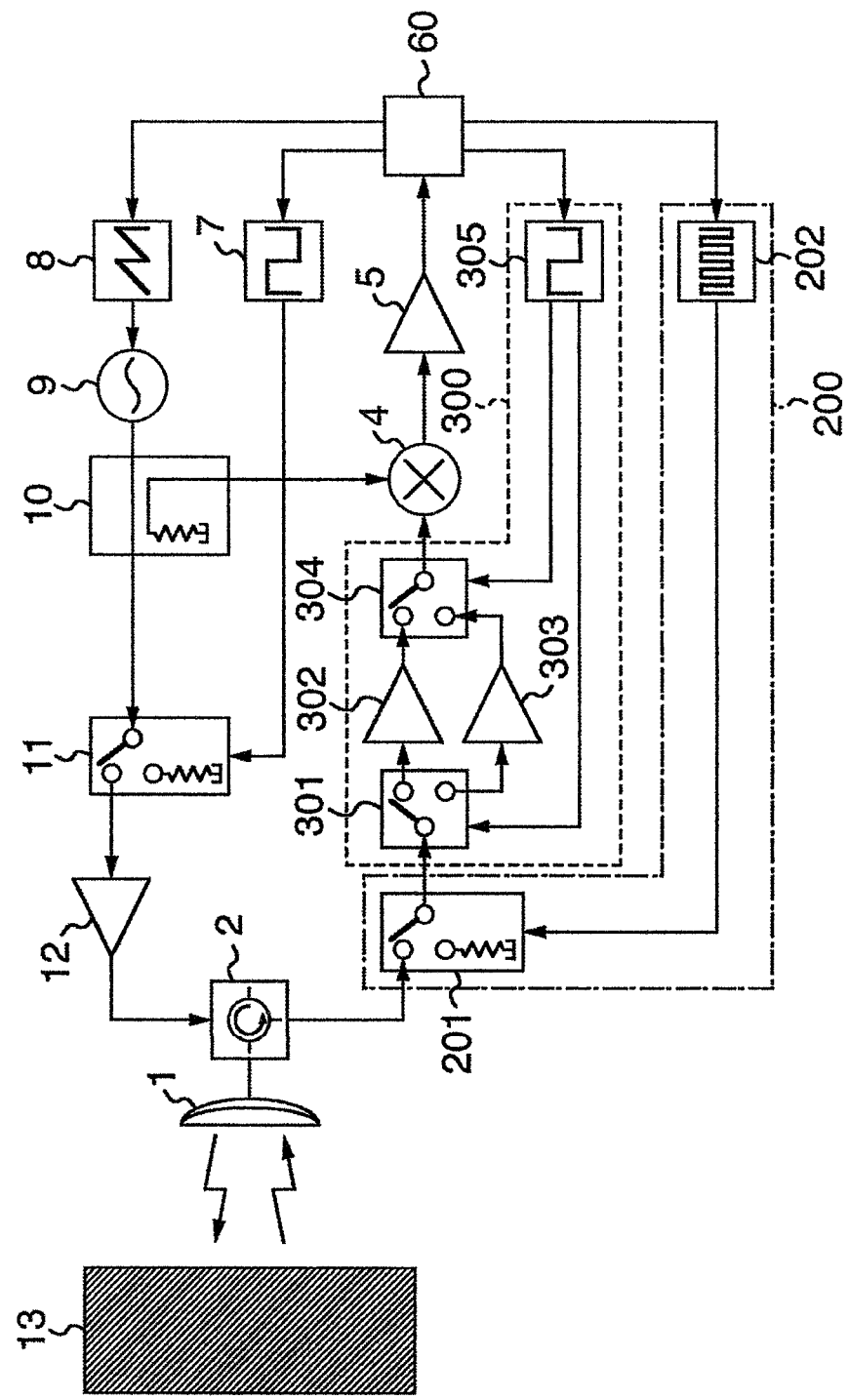
FIG. 7 is a configuration diagram illustrating a function of the multi-function radar apparatus according to a fourth embodiment of the invention.

A relationship among the control voltage of the frequency modulation signal generating unit 8, the frequency modulation of the high-frequency signal generating unit 9, the control voltage of the intermittent stop signal generating unit 7, and the control voltage of the measurement noise switching signal generating unit 202 in the present embodiment is illustrated in FIG. 6.

FIG. 6(a) illustrates the control voltage of the frequency modulation signal generating unit 8, FIG. 6(b) illustrates the frequency modulation of the high-frequency signal generating unit 9, and FIG. 6(c) illustrates the control voltage of the intermittent stop signal generating unit 7. The relationship among the above items is the same as that of FIG. 2 described in the first embodiment, and therefore the description will be omitted.

FIG. 6(d) illustrates the control voltage of the measurement noise switching signal generating unit 202. While the control voltage of the intermittent stop signal generating unit 7 illustrated in FIG. 6 is turned "OFF", the control voltage of the measurement noise switching signal generating unit 202 repeats "ON" or "OFF" N times in each time T2, and maintains a state of "ON" or "OFF" during each time T2. Note that while the control voltage of the intermittent stop signal generating unit 7 illustrated in FIG. 6 is turned "ON", the control voltage of the measurement noise switching signal generating unit 202 remains to be turned "OFF".

When the control voltage of the measurement noise switching signal generating unit 202 is turned "OFF", the measurement noise switching unit 200 supplies the reception signal produced from the circulator unit 2 to the reception signal amplifying unit 3. When the control voltage of the measurement noise switching signal generating unit 202 is turned "ON", the measurement noise switching unit 200 fails to supply the reception signal produced from the circulator unit 2 to the reception signal amplifying unit 3. Accordingly, during the time T1 when the transmission signal is not emitted, when the control voltage of the intermittent stop signal generating unit 7 is turned OFF, the measurement noise switching unit 200 performs a switching operation N times so as to supply any one of the reception signal produced from the circulator unit 2 and the reception signal including thermal noise within the multi-function radar apparatus 353 to the reception signal amplifying unit 3 based on the relationship of time $T1 = \text{time } T2 \times N$.

As can be seen from the above discussion, when the measurement noise switching unit 200 is provided, the multi-function radar apparatus 353 according to the present embodiment can compare radiated waves from the target object 13 and thermal noise within the multi-function radar apparatus 353, and therefore improve accuracy for measuring the temperature of the target object 13.

<Fourth Embodiment>

The present embodiment results from combining the above-described second and third embodiments with the first embodiment. That is, the multi-function radar apparatus 353 according to the present embodiment includes the above-described measurement noise switching unit 200 and gain adjustment unit 300. The same reference numerals as those of the first embodiment are given to the same components as in the first embodiment, and the description will be omitted.

The measurement noise switching unit 200 is connected to the circulator unit 2. According to the control voltage produced from the measurement noise switching signal generating unit 202, the measurement noise switching unit 200 switches over a signal path so as to supply the reception signal produced from the circulator unit 2 or the reception signal including thermal noise within the multi-function radar apparatus to the gain adjustment unit 300.

According to the control voltage produced from the gain-switching signal generating unit 305, the gain adjustment unit 300 amplifies the reception signal produced from the measurement noise switching unit 200 by the first reception signal amplifying unit 302 or the second reception signal amplifying unit 303, and supplies it to the frequency converting unit 4.

In the frequency converting unit 4, the reception signal and the transmission signal branched by the high-frequency signal branching unit 10 are mixed and a beat signal being a difference signal between the transmission signal and the reception signal is generated. The generated beat signal is amplified by the beat signal amplifying unit 5, and is supplied to the signal processing unit 60.

While the transmission signal is emitted, the signal processing unit 60 calculates the distance to the target object 13 based on the beat signal produced from the beat signal amplifying unit 5. While the transmission signal is not emitted, the signal processing unit 60 calculates the temperature of the target object 13 based on the beat signal produced from the beat signal amplifying unit 5.

Figure 8:
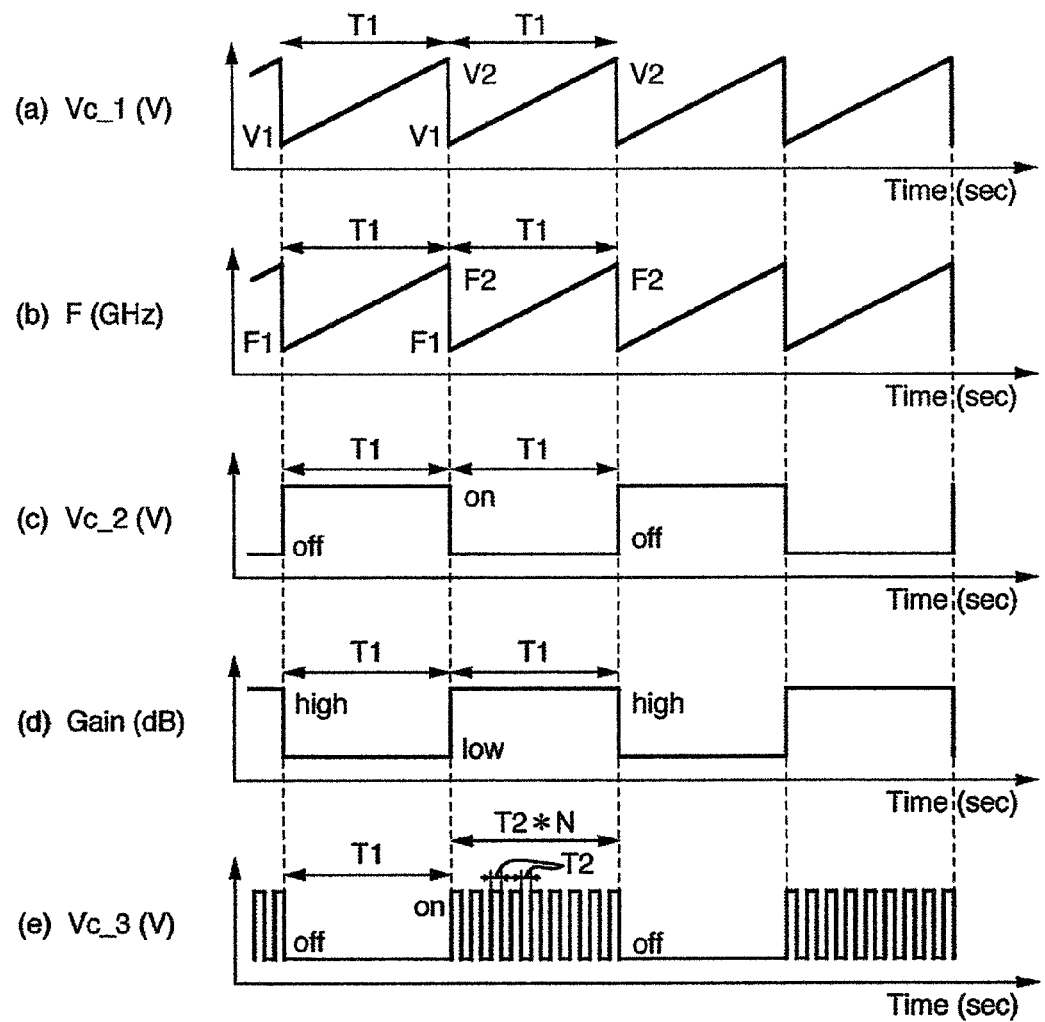
FIG. 8 is schematic diagrams of control using the control voltage of the multi-function radar apparatus according to the third embodiment of the invention, FIG. 8($a$) illustrates an outline of the control voltage of the frequency modulation signal generating unit, FIG. 8($b$) illustrates an outline of a frequency of the high-frequency signal generating unit, FIG. 8($c$) illustrates an outline of the control voltage of the intermittent stop signal generating unit, FIG. 8($d$) illustrates an outline of a gain of the gain adjustment unit, and FIG. 8($e$) illustrates an outline of the control voltage of the measurement noise switching signal generating unit.
Figure 9:
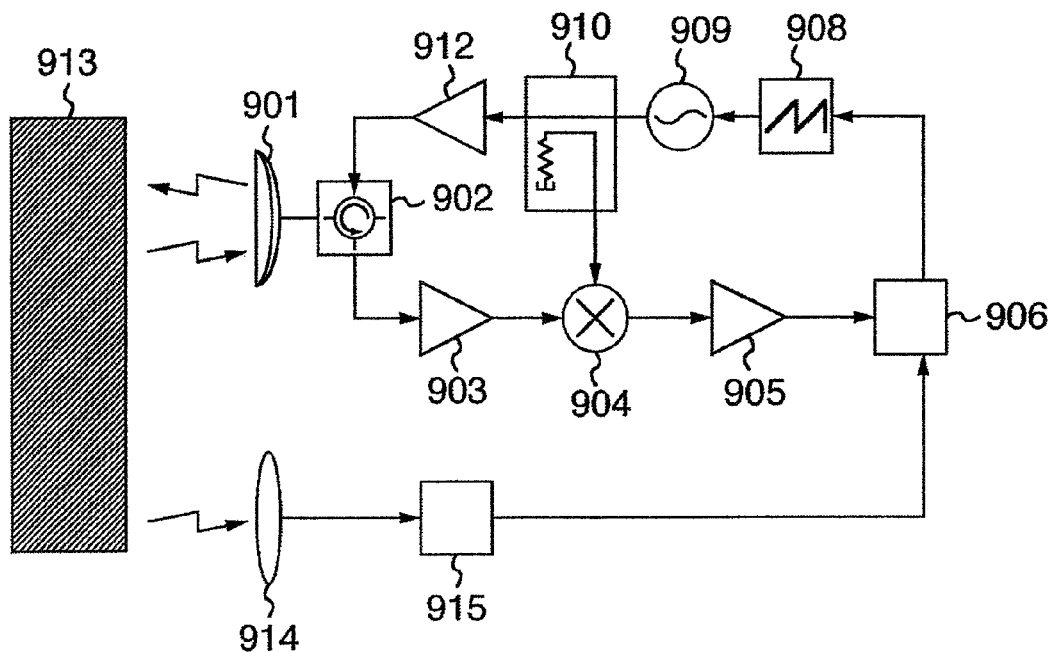
FIG. 9 is a configuration diagram illustrating a conventional measuring device collectively having functions for measuring a distance to a target object and a temperature of the target object.
Figure 10:
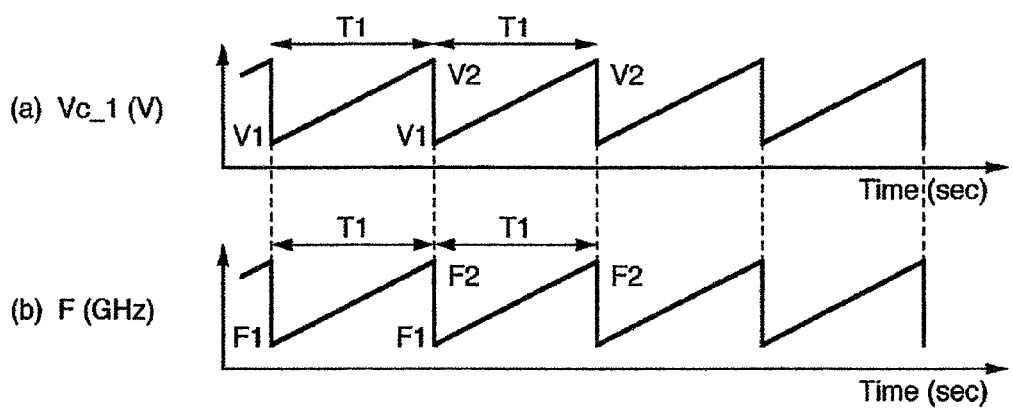
FIG. 10 is schematic diagrams of control using the control voltage of a conventional measuring device, FIG. 10($a$) illustrates an outline of the control voltage of the frequency modulation signal generating unit, and FIG. 10($b$) illustrates an outline of a frequency of the high-frequency signal generating unit.

A relationship among the control voltage of the frequency modulation signal generating unit 8, the frequency modulation of the high-frequency signal generating unit 9, the control voltage of the intermittent stop signal generating unit 7, the gain of the gain adjustment unit 300, and the control voltage of the measurement noise switching signal generating unit 202 in the present embodiment is illustrated in FIG. 8.

FIG. 8(a) illustrates the control voltage of the frequency modulation signal generating unit 8, FIG. 8(b) illustrates the frequency modulation of the high-frequency signal generating unit 9, and FIG. 8(c) illustrates the control voltage of the intermittent stop signal generating unit 7. The relationship among the above items is the same as that of FIG. 2 described in the first embodiment, and therefore the description will be omitted. Further, FIG. 8(d) illustrates the gain of the gain adjustment unit 300, and FIG. 8(e) illustrates the control voltage of the measurement noise switching signal generating unit 202. A relationship between FIG. 8(d) and FIGS. 8(a) to 8(c) is the same as that of FIG. 4 described in the second embodiment, and a relationship between FIG. 8(e) and FIGS. 8(a) to 8(c) is the same as that of FIG. 6 described in the third embodiment.

While the control voltage of the intermittent stop signal generating unit 7 illustrated in FIG. 8(c) is turned "ON", the transmission signal is emitted. Therefore, the control voltage of the measurement noise switching signal generating unit 202 illustrated in FIG. 8(e) is maintained in "OFF". Therefore, the measurement noise switching unit 200 supplies the reception signal produced from the circulator unit 2 to the gain adjustment unit 300. At this time, the reception signal supplied to the gain adjustment unit 300 is produced with a low gain as illustrated in FIG. 8(d).

On the other hand, while the control voltage of the intermittent stop signal generating unit 7 illustrated in FIG. 8(c) is turned "OFF", the transmission signal is not emitted. Therefore, the control voltage of the measurement noise switching signal generating unit 202 illustrated in FIG. 8(e) is switched "ON" or "OFF" N times so as to be T1=T2×N. As a result, the measurement noise switching unit 200 alternately supplies the reception signal produced from the circulator unit 2 and the reception signal including thermal noise within the multi-function radar apparatus 353 to the gain adjustment unit 300. At this time, the reception signal supplied to the gain adjustment unit 300 is produced with a high gain as illustrated in FIG. 8(d).

As can be seen from the above sequence, the multi-function radar apparatus 353 according to the present embodiment includes the measurement noise switching unit 200 and the gain adjustment unit 300. Therefore, when comparing the radiated waves from the target object 13 and the thermal noise within the multi-function radar apparatus 353, the multi-function radar apparatus 353 can improve accuracy for measuring the temperature of the target object 13. At the same time, even if there is a difference between levels of the reception signals supplied to the multi-function radar apparatus 353, the multi-function radar apparatus 353 can amplify the reception signal by a gain appropriate to each level thereof, and therefore improve the measurement sensitivity.

In the above-described first to fourth embodiments, each value repeatedly changes in each time T1 in A to C of FIGS. 2, 4, 6, and 8. In particular, a combination of the time is not limited thereto. For example, the time when the transmission signal is not emitted may be set to n×T1, and the time when the transmission signal is emitted may be set to m×T1.

Further, in the above-described first to fourth embodiments, the gain adjustment unit 300 adjusts one gain of the reception signal supplied to the gain adjustment unit 300 while the transmission signal is not emitted more than another gain of the reception signal supplied to the gain adjustment unit 300 while the transmission signal is emitted; further, may appropriately adjust the gain of the reception signal according to a level of the reception signal supplied to the gain adjustment unit 300.

In the third and fourth embodiments, when the control voltage of the intermittent stop signal generating unit 7 of FIGS. 6 and 8 is turned "OFF", the control voltage of the measurement noise switching signal generating unit 202 is switched over 17 times. As a result, the relationship of time $T1$=time $T2\times17$ is maintained. However, when performing a switching operation at least twice, both of the reception signal produced from the circulator unit 2 and the reception signal including thermal noise within the multi-function radar apparatus 353 are produced. Therefore, the signal processing unit 60 can use both the reception signals for comparison processing.

Further, in the third and fourth embodiments, the multi-function radar apparatus 353 may have a configuration in which when the control voltage of the intermittent stop signal generating unit 7 is turned "ON", namely, also when the transmission signal is emitted, the control voltage of the measurement noise switching signal generating unit 202 is switched over in the same manner as in the case where the control voltage of the intermittent stop signal generating unit 7 is turned "ON".

<Fifth Embodiment>

Figure 11:
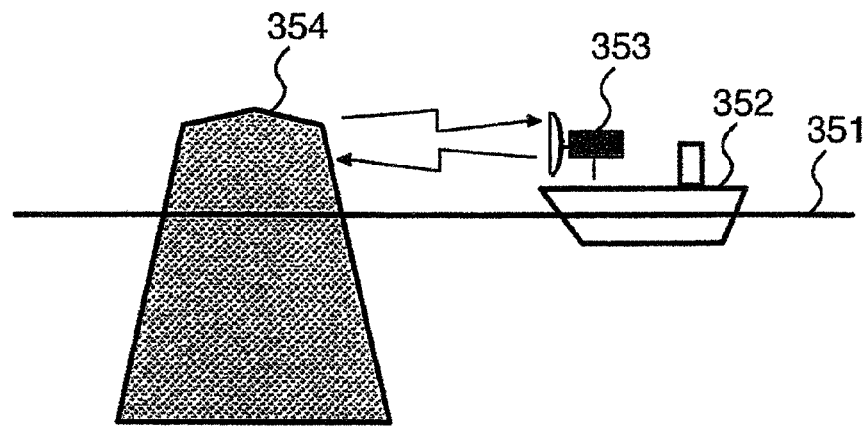
FIG. 11 illustrates the multi-function radar apparatus according to a fifth embodiment of the invention.

FIG. 11 illustrates a fifth embodiment of the invention. The multi-function radar apparatus 353 according to the present embodiment may be configured based on the first to fourth embodiments, and further based on a modification embodiment in which a modification is added to the above-described embodiments. The same reference numerals as those of the other embodiments are given to the same components as in the other embodiments, and the description will be omitted.

An outline of the fifth embodiment will be described. From a ship 352 that sails over the sea 351, when a view is poor by dense fog day and night, a sailor may not distinguish a target object 354 such as drift ice. In the above-described case, when the multi-function radar apparatus 353 simultaneously measures a distance to the target object 354 such as drift ice and a temperature of the target object 354, it can be distinguished as drift ice, drifting article, or high-temperature melted rock.

The fifth embodiment will be described in detail. In FIG. 11, the ship 352 on which the multi-function radar apparatus 353 is installed sails on the sea 351. When measuring the distance to the target object 354 and the temperature of the target object 354, the multi-function radar apparatus 353 emits transmission signals from the transmitting and receiving antenna 1 thereof toward the target object 354. The emitted transmission signal is reflected by the target object 354, and the reflected waves are supplied to the transmitting and receiving antenna 1. The multi-function radar apparatus 353 calculates the distance to the target object 354 based on the input reflected waves. The transmitting and receiving antenna 1 receives radiated waves from the target object 354 while the transmission signal is not emitted or intermittently stopped. The multi-function radar apparatus 353 calculates the temperature of the target object 354 based on the received radiated waves. Here, the distance and the temperature may be calculated based on the above-described embodiments or the modification embodiment in which a modification is added to the above-described embodiments. Further, when the distance to the target object 354 is measured two or more times, operations of the target object 354 can be known.

Although the description will not be made, a configuration in which a type of the identified object is displayed along with the measured distance and temperature may be included as one of the methods for identifying the target object 354 by the multi-function radar apparatus 353. For realizing the configuration, previously-stored data table in which a relationship among the measured distance (operations), temperature, and type of the object is represented may be included. Further, when the multi-function radar apparatus 353 measures the distance (operations) to the target object 354 and the temperature of the target object 354, an object identification unit that identifies a type of objects may be included based on the measured distance (operations) to the object and the temperature of the object. When a type of the target objects can be identified, even an operator having little boarding experience or knowledge on the objects can appropriately identify a type of objects.

According to the fifth embodiment, even if a view is poor, when a distance to a target object such as drift ice and a temperature of the target object are measured at the same time, an obstruction such as drift ice in the travelling direction of ships or in the arbitrary direction of ships can be previously known. Further, since a type of objects such as drift ice, drifting article, or high-temperature melted rock can be identified, the multi-function radar apparatus 353 can make a contribution to a safe navigation of ships.

Further, since a ship itself rocks on the sea, an absolute coordinate of the multi-function radar apparatus 353 installed on the ship is not always stabilized. For example, even if the rock is compensated, when antennas for measuring a distance and a temperature are used separately, accuracy of the measurement is reduced. On the other hand, the multi-function radar apparatus 353 according to the present embodiment has a configuration in which the antennas for measuring the distance and the temperature are integrated with each other. Therefore, as compared with a conventional radar device to which antennas for measuring a distance and a temperature are fixed separately, the multi-function radar apparatus 353 can measure the target objects with high accuracy while curbing the influence of the rock of ships at a minimum.

<Sixth Embodiment>

Figure 12:
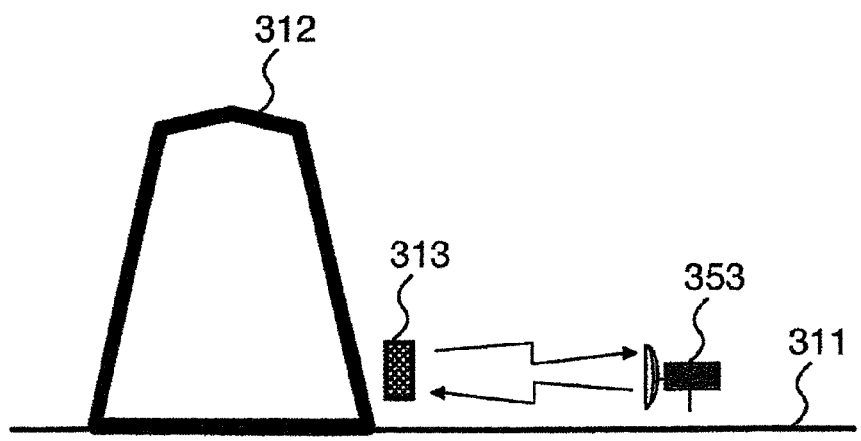
FIG. 12 illustrates the multi-function radar apparatus according to a sixth embodiment of the invention.

FIG. 12 illustrates a sixth embodiment of the multiple-function radar device to which the present invention is applied. The multi-function radar apparatus 353 according to the present embodiment may be configured based on the first to fourth embodiments, and further based on the modification embodiment in which a modification is added to the present embodiments. The same reference numerals as those of the other embodiments are given to the same components as in the other embodiments, and the description will be omitted.

An outline of the sixth embodiment will be described. When a view is poor on the drift ice 311 by dense fog day and night, a moving target object 313 with the same color may not be distinguished from an object 312 in the background. In the above-described case, when a distance to the target object 313 and a temperature of the target object 313 are measured at the same time by the multi-function radar apparatus 353, the target object 313 that is hard to be determined by an optical method can be distinguished from the object 312 in the background.

The sixth embodiment will be described in detail. In FIG. 12, the multi-function radar apparatus 353 is installed on the drift ice 311. The transmitting and receiving antenna 1 of the multi-function radar apparatus 353 emits a transmission signal toward the target object 313. The emitted transmission signal is reflected by the target object 313, and the reflected waves are input to the transmitting and receiving antenna 1. The multi-function radar apparatus 353 calculates the distance to the target object 313 based on the input reflected waves. When the transmission signal is not emitted or intermittently stopped, the transmitting and receiving antenna 1 receives radiated waves from the target object 313. Based on the received radiated waves, the multi-function radar apparatus 353 calculates the temperature of the target object 313. Here, the distance and the temperature may be calculated based on the above-described embodiments or based on the modification embodiment in which a modification is added to the above-described embodiments. In addition, when the distance to the target object 313 is measured two or more times, operations of the target object 313 can be known.

Further, the multi-function radar apparatus 353 (according to all the embodiments including the present embodiment) has a predetermined resolution. Therefore, not only information on the target object 313 but also information on the periphery of the target object 313 according to the resolution can be acquired. When a position of the multi-function radar apparatus 353 is further moved or a direction of the transmitting and receiving antenna 1 is changed, more information can be known. For example, a distance to the object 312 in the background and a temperature thereof can be calculated. This permits the multi-function radar apparatus 353 to know a relative relationship between the object 312 in the background and the target object 313.

According to the sixth embodiment, the multi-function radar apparatus 353 can distinguish the target object 313 that is hard to be determined by an optical method from the object 313 in the background when simultaneously measuring the distance to the moving target object 313 with the same color and the temperature thereof even if a view is poor on the ice by dense fog day and night.

<Seventh Embodiment>

Figure 13:
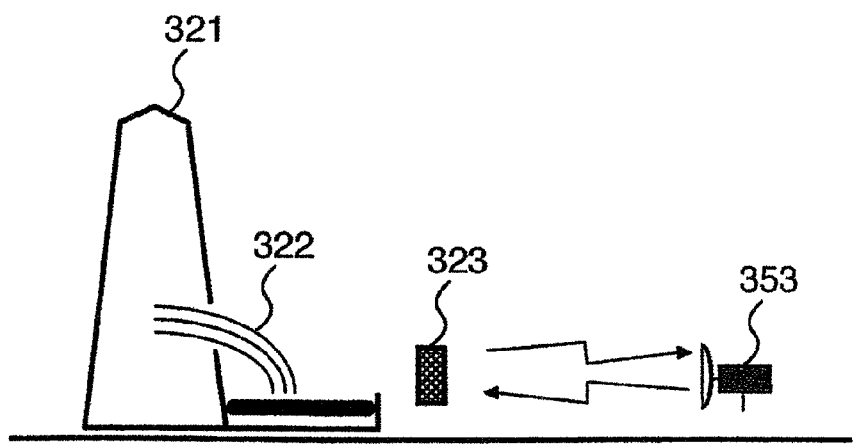
FIG. 13 illustrates the multi-function radar apparatus according to a seventh embodiment of the invention.

FIG. 13 illustrates a seventh embodiment of the multi-function radar apparatus 353 to which the present invention is applied. The multi-function radar apparatus 353 according to the present embodiment may be configured based on the first to fourth embodiments or based on the modification embodiment which a modification is added to the above-described embodiments. The same reference numerals as those of the other embodiments are given to the same components as in the other embodiments, and the description will be omitted.

An outline of the seventh embodiment will be described. When the target object 323 moves in front of a high-temperature fluid object 322 with high luminance as in a blast furnace 321, the target object 323 may not be distinguished. In the above-described case, when a distance to the moving target object 323 and a temperature of the moving target object 323 are measured at the same time by the multi-function radar apparatus 353, the target object 323 that is hard to be determined by an optical method can be distinguished.

The seventh embodiment will be described in detail. In FIG. 13, the multi-function radar apparatus 353 is installed at an arbitrary place. The multi-function radar apparatus 353 emits transmission signals toward the target object 323 from the transmitting and receiving antenna 1 thereof. The emitted transmission signals are reflected by the target object 323, and the reflected waves are input to the transmitting and receiving antenna 1. The multi-function radar apparatus 353 calculates a distance to the target object 323 based on the input reflected waves. When the transmission signal is not emitted or intermittently stopped, the transmitting and receiving antenna 1 receives radiated waves from the target object 323. Based on the received radiated waves, the multi-function radar apparatus 353 calculates the temperature of the target object 323. Here, the distance and the temperature may be calculated based on the above-described embodiments or based on the modification embodiment in which a modification is added to the above-described embodiments. In addition, when the distance to the target object 323 is measured two or more times, operations of the target object 323 can be known.

In FIG. 13, since the fluid object 322 emits light in high luminance, the target object 323 is hard to be confirmed by human eyes. However, the multi-function radar apparatus 353 uses an electromagnetic wave in a frequency domain different from visible light. Therefore, the multi-function radar apparatus 353 is not affected by visible light and can calculate the distance to the target object 323 and the temperature of the target object 323. When a position of the multi-function radar apparatus 353 is further moved or a direction of the transmitting and receiving antenna 1 is changed, the distances to the blast furnace 321 and the fluid object 322 and the temperatures thereof also can be calculated. As a result, a relative relationship among the target object 323, the blast furnace 321, and the fluid object 322 can be known.

According to the seventh embodiment, the multi-function radar apparatus 353 can distinguish the target object 323 that is hard to be determined by an optical method in the case where the target object 323 moves in front of the high-temperature fluid object 322 with high luminance as in the blast furnace 321 when simultaneously measuring the distance to the moving target object 323 and the temperature of the moving target object 323.

<Eighth Embodiment>

Figure 14:
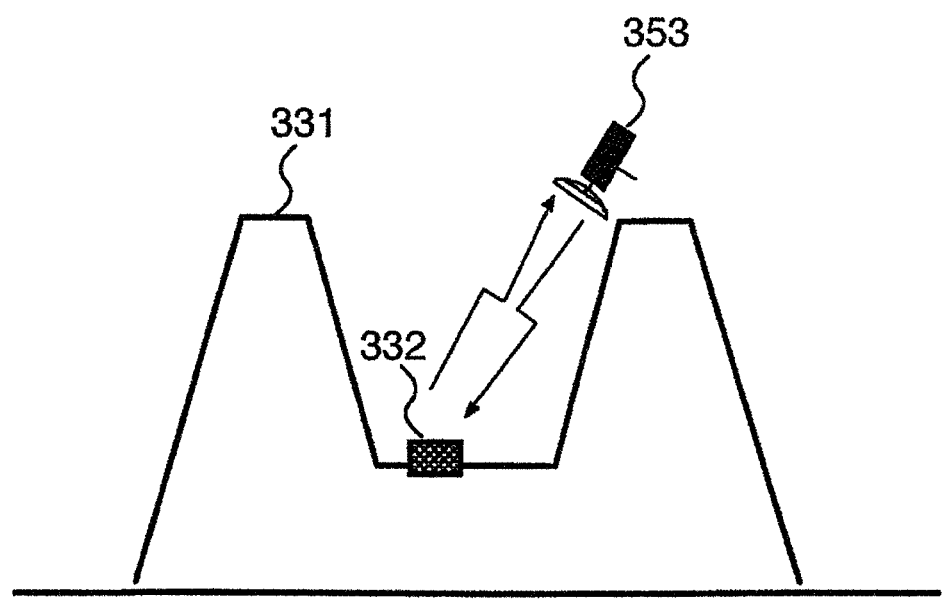
FIG. 14 illustrates the multi-function radar apparatus according to an eighth embodiment of the invention.

FIG. 14 illustrates an eighth embodiment of the multi-function radar apparatus to which the present invention is applied. The multi-function radar apparatus according to the present embodiment may be configured based on the first to fourth embodiments or based on the modification embodiment which a modification is added to the above-described embodiments. The same reference numerals as those of the other embodiments are given to the same components as in the other embodiments, and the description will be omitted.

An outline of the eighth embodiment will be described. When a view is poor by fog, smoke, and vapor day and night, a target object 332 such as lava in a crater on volcanoes may not be distinguished. In the above-described case, when a distance to the target object 332 and a temperature of the target object 332 are measured at the same time by the multi-function radar apparatus 353, the target object 332 that is hard to be determined by an optical method can be distinguished.

The eighth embodiment will be described in detail. In FIG. 14, the multi-function radar apparatus 353 is installed at an arbitrary position of the volcano 331. The transmitting and receiving antenna 1 of the multi-function radar apparatus 353 is directed in the direction in which the target object 332 is assumed to be present.

The multi-function radar apparatus 353 emits transmission signals while directing the transmitting and receiving antenna 1 to the target object 332. The emitted transmission signals are reflected by the target object 332, and the reflected waves are input to the transmitting and receiving antenna 1. The multi-function radar apparatus 353 calculates a distance to the target object 313 based on the input reflected waves. While the transmission signal is not emitted or intermittently stopped, the transmitting and receiving antenna 1 receives radiated waves from the target object 332. Based on the received radiated waves, the multi-function radar apparatus 353 calculates a temperature of the target object 332. Here, the distance and the temperature may be calculated based on the above-described embodiments or based on the modification embodiment in which a modification is added to the above-described embodiments. In addition, when the distance to the target object 332 is measured two or more times, operations of the target object 332 can be known.

The multi-function radar apparatus 353 can confirm the presence or absence of the target object 332 from the calculated distance and temperature. When determining that the target object 332 is not present, a position of the multi-function radar apparatus 353 is moved or a direction of the transmitting and receiving antenna 1 is changed to emit transmission signals again.

As described in the above embodiments, the time per search for calculating a distance to the target object and a temperature of the target object is short. First, when the above-described process is performed while swinging the antenna, the entire area of predetermined size including a place in which the target object 332 is thought to be present can be simply searched. Then, there may be adopted a method for setting up a standard, directing the antenna to a point in which the target object 332 is thought to be present, and searching the point in detail.

In FIG. 14, when a view is poor around the target object 332, the target object 332 is hard to be confirmed by human eyes. However, the multi-function radar apparatus 353 can circumvent the effect of fog, smoke, and vapor that cut off the view, and emit radio waves to the target object 332. Further, the multi-function radar apparatus 353 can receive the reflected waves and radiated waves from the target object 332, and therefore, calculate the distance to the target object 332 and the temperature of the target object 332.

According to the eighth embodiment, the multi-function radar apparatus 353 can distinguish the target object 332 that is hard to be determined by an optical method when simultaneously measuring the distance to the target object 332 and the temperature of the target object 332 such as lava in a crater on volcanoes even if a view is poor by fog, smoke, and vapor day and night.

<Ninth Embodiment>

Figure 15:
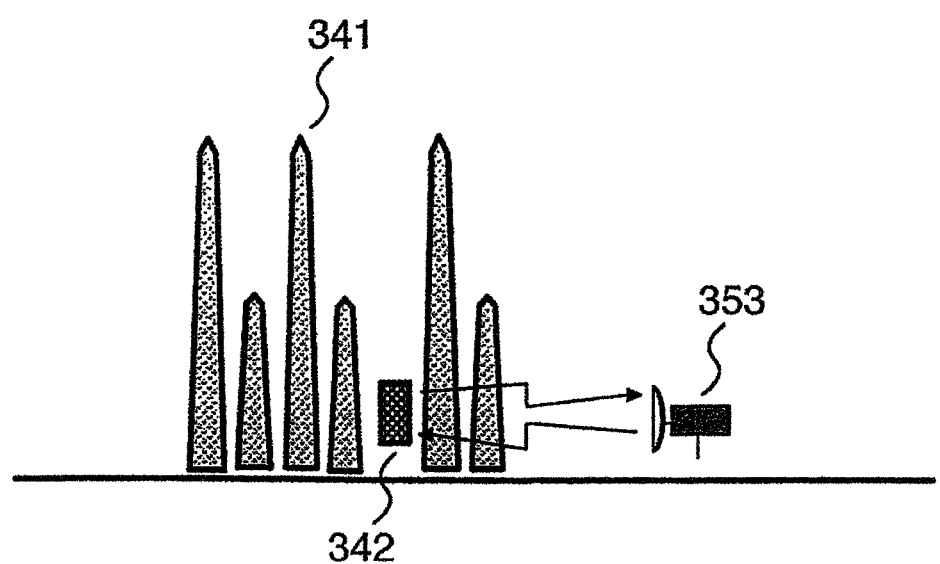
FIG. 15 illustrates the multi-function radar apparatus according to a ninth embodiment of the invention.

FIG. 15 illustrates a ninth embodiment of the multi-function radar apparatus 353 to which the present invention is applied. The multi-function radar apparatus 353 according to the present embodiment may be configured based on the first to fourth embodiments or based on the modification embodiment which a modification is added to the above-described embodiments. The same reference numerals as those of the other embodiments are given to the same components as in the other embodiments, and the description will be omitted.

An outline of the ninth embodiment will be described. When a view is poor by fog, smoke, and vapor day and night, a target object 342 such as an animal that hides in plants 341 or steps outside plants 341 may not be distinguished. In the above-described case, when a distance to the target object 342 and a temperature of the target object 342 are measured at the same time by the multi-function radar apparatus 353, the target object 342 can be distinguished from the plants 341 that swing by the wind and rain.

The ninth embodiment will be described in detail. In FIG. 15, the multi-function radar apparatus 353 is installed at an arbitrary position. The multi-function radar apparatus 353 emits transmission signals while directing the transmitting and receiving antenna 1 toward the target object 342. The emitted transmission signals are reflected by the target object 342, and the reflected waves are input to the transmitting and receiving antenna 1. The multi-function radar apparatus 353 calculates a distance to the target object 342 based on the input reflected waves. While the transmission signal is not emitted or intermittently stopped, the transmitting and receiving antenna 1 receives radiated waves from the target object 342. Based on the received radiated waves, the multi-function radar apparatus 353 calculates the temperature of the target object 342. Here, the distance and the temperature may be calculated based on the above-described embodiments or based on the modification embodiment in which a modification is added to the above-described embodiments. In addition, when the distance to the target object 342 is measured two or more times, operations of the target object 342 can be known.

Further, when moving a position of the multi-function radar apparatus 353 or changing a direction of the transmitting and receiving antenna 1, the multi-function radar apparatus 353 can know the distances to the animal 342 being the target object 342 and the plant 341 therearound and the temperatures thereof. The target object 342 such as an animal is obviously different from the plant 341 also in the movement and temperature. In general, for example, an animal moves based on its intention, and moves not periodically, but irregularly.

As compared with the above, the movement of plants is affected by nature such as wind, and therefore, is approximately periodic. The temperature of an animal is relatively high, and on the other hand, the temperature of a plant is relatively low. When taking the above into consideration, the animal 342 can be distinguished from the plant 341.

According to the ninth embodiment, the multi-function radar apparatus 353 can distinguish the animal from the plants that swing by the wind and rain when simultaneously measuring the distance to the target object and the temperature of the target object such as an animal that hides in plants or steps outside plants even if a view is poor by fog, smoke, and vapor day and night.

When giving an outline of the above, a multi-function radar apparatus of the present invention having a high-frequency signal generating unit that supplies a frequency-modulated transmission signal, an antenna that emits the transmission signal to a target object and receives measurement information on the target object as a reception signal, a frequency converting unit that mixes the transmission signal and the reception signal to generate a beat signal, and a signal processing unit that performs measurement on the target object based on the beat signal, includes a transmission signal intermittent stop unit that intermittently stops emission of the transmission signal, wherein the antenna receives a reflected wave from the target object as the measurement information while the transmission signal is emitted, and receives a radiated wave from the target object as the measurement information while the transmission signal is not emitted, and the signal processing unit measures a distance to the target object based on the beat signal while the transmission signal is emitted, and measures a temperature of the target object based on the beat signal while the transmission signal is not emitted.

Further, the multi-function radar apparatus may include a gain adjustment unit that adjusts a gain of the reception signal.

The gain adjustment unit may supply to the frequency converting unit with a low gain a reception signal input during the time when the transmission signal is emitted, and may supply to the frequency converting unit with a high gain a reception signal input during the time when the transmission signal is not emitted.

Further, the multi-function radar apparatus may include a measurement noise switching unit that inputs thermal noise within the multi-function radar apparatus as the reception signal. While the transmission signal is not emitted, the signal processing unit may compare one beat signal based on a radiated wave from the target object and another beat signal based on thermal noise within the multi-function radar apparatus, and measure a temperature of the target object.

The invention is not limited to the above embodiment, and may take on various modifications and alterations without departing from its spirit and scope. Further, the same names and reference numerals are given to circuit components having the same function. The present invention has been explained in detail and with reference to the specific embodiment. However, it is apparent for those skilled in the art that the present invention can be changed or modified in various manners without departing from the spirit and scope of the invention.

REFERENCE SIGNS LIST 1, 901 Transmitting and receiving antenna
2, 902 Circulator unit
3, 903 Reception signal amplifying unit
4, 904 Frequency converting unit
5, 905 Beat signal amplifying unit
6, 60, 906 Signal processing unit
7 Intermittent stop signal generating unit
8, 908 Frequency modulation signal generating unit
9, 909 High-frequency signal generating unit
10, 910 High-frequency signal branching unit
11 Transmission intermittent stop switch
12, 912 Transmission signal amplifying unit
13, 913 Target object
200 Measurement noise switching unit
201 Reception signal changeover switch
202 Measurement noise switching signal generating unit
300 Gain adjustment unit
301 First reception signal changeover switch
302 First reception signal amplifying unit
303 Second reception signal amplifying unit
304 Second reception signal changeover switch
305 Gain-switching signal generating unit
351 Sea (on the sea)
352 Ship
353 Multi-function radar apparatus
354 Target object
311 Ice (on the ice)
312 Object
313 Target object
321 Blast furnace
322 Fluid object
323 Target object
331 Volcano
332 Target object
342 Target object
341 Plant
914 Infrared light receiving lens
915 Infrared thermometer

The invention claimed is:

1. A multi-function radar apparatus having
a high-frequency signal generating unit that supplies a frequency-modulated transmission signal,
an antenna that emits the transmission signal to a target object and receives measurement information on the target object as a reception signal,
a frequency converting unit that mixes the transmission signal and the reception signal to generate a beat signal, and
a signal processing unit that performs measurement on the target object based on the beat signal, comprising:
a transmission signal intermittent stop unit that intermittently stops emission of the transmission signal,
wherein:
the antenna receives a reflected wave from the target object as the measurement information while the transmission signal is emitted, and receives a radiated wave from the target object as the measurement information while the transmission signal is not emitted; and
the signal processing unit measures a distance to the target object based on the beat signal while the transmission signal is emitted, and measures a temperature of the target object based on the beat signal while the transmission signal is not emitted.

2. The multi-function radar apparatus according to claim 1, further comprising a reception signal amplifying unit between the antenna and the frequency converting unit, wherein:
the reception signal amplifying unit is configured so that the reception signal can be amplified with a different gain;
when the radiated wave is received as the measurement information, a gain of the reception signal amplifying unit is adjusted relatively high; and
when the reflected wave is received as the measurement information, a gain of the reception signal amplifying unit is adjusted relatively low.

3. The multi-function radar apparatus according to claim 1, further comprising a thermal noise switching unit that supplies thermal noise within the multi-function radar apparatus when an input of the reception signal is intermittently stopped or the reception signal is not received,
wherein a first beat signal based on the thermal noise within the multi-function radar apparatus and a second beat signal based on the radiated wave are compared and a temperature of the target object is measured.

4. The multi-function radar apparatus according to claim 1, further comprising a thermal noise switching unit that supplies thermal noise within the multi-function radar apparatus to the frequency converting unit,
wherein a first beat signal based on the thermal noise within the multi-function radar apparatus and a second beat signal based on the reflected wave are compared and a distance to the target object is measured.

5. The multi-function radar apparatus according to claim 3, wherein:
the transmission signal intermittent stop unit intermittently stops emission of the transmission signal at a first intermittent period;
the thermal noise switching unit intermittently stops an input of the reception signal at a second intermittent period when a signal of the first intermittent period is present under predetermined conditions; and
the second intermittent period is shorter than the first intermittent period.

6. A method of measuring two or more physical values in a multi-function radar apparatus, comprising the steps of:
outputting a frequency-modulated transmission signal;
emitting the transmission signal to a target object and receiving measurement information on the target object as a reception signal;
mixing the transmission signal and the reception signal and performing frequency-conversion for generating a beat signal;
intermittently stopping emission of the transmission signal;
receiving a reflected wave from the target object as the measurement information while the transmission signal is emitted;
receiving a radiated wave from the target object as the measurement information while the transmission signal is not emitted;
measuring a distance to the target object based on the beat signal while the transmission signal is emitted; and
measuring a temperature of the target object based on the beat signal while the transmission signal is not emitted.

7. A program for a multi-function radar apparatus having a high-frequency signal generating unit that outputs a frequency-modulated transmission signal, an antenna that emits the transmission signal to a target object and receives measurement information on the target object as a reception signal, a frequency converting unit that mixes the transmission signal and the reception signal to generate a beat signal, and a signal processing unit that performs measurement on the target object based on the beat signal, comprising the steps of:
intermittently stopping emission of the transmission signal;
receiving a reflected wave from the target object as the measurement information while the transmission signal is emitted, and receiving a radiated wave from the target object as the measurement information while the transmission signal is not emitted; and
measuring a distance to the target object based on the beat signal while the transmission signal is emitted, and measuring a temperature of the target object based on the beat signal while the transmission signal is not emitted.

* * * * *